United States Patent [19]

Lhymn et al.

[11] Patent Number: 4,927,712

[45] Date of Patent: May 22, 1990

[54] FUSIBLE CORE ALLOY COMPOSITES FOR PLASTICS MOLDING

[75] Inventors: Yoon O. Lhymn; Chang Lhymn, both of Erie, Pa.

[73] Assignee: Yoon Technology, Erie, Pa.

[21] Appl. No.: 197,170

[22] Filed: May 23, 1988

Related U.S. Application Data

[63] Continuation-in-part of Ser. No. 187,734, Apr. 27, 1988, which is a continuation-in-part of Ser. No. 166,060, Mar. 9, 1988.

[51] Int. Cl.$^5$ .................. B22C 12/00; B22C 13/00; B22C 13/02
[52] U.S. Cl. ................................................. 428/614
[58] Field of Search .................. 428/614; 420/559

[56] References Cited

U.S. PATENT DOCUMENTS

| | | | |
|---|---|---|---|
| 1,628,759 | 5/1927 | Worrall | 428/614 |
| 3,166,808 | 1/1965 | Moore | 164/132 |
| 3,566,512 | 8/1965 | Lane | 228/263.12 |
| 3,605,902 | 9/1971 | Ault | 428/608 |
| 3,622,283 | 11/1971 | Sara | 428/614 |
| 3,638,734 | 2/1972 | Ault | 428/608 |
| 3,864,807 | 2/1975 | Schneider et al. | 428/614 |
| 4,341,823 | 7/1982 | Sexton et al. | 428/614 |

FOREIGN PATENT DOCUMENTS

| | | |
|---|---|---|
| 2302346 | 9/1976 | France . |
| 123845 | 9/1981 | Japan . |
| 89940 | 6/1982 | Japan . |
| 82059 | 5/1983 | Japan . |
| 4940 | 1/1984 | Japan . |
| 136215 | 8/1984 | Japan . |
| 94323 | 5/1985 | Japan . |
| 63413 | 4/1986 | Japan . |

OTHER PUBLICATIONS

Umekawa et al., Metals ab. 70(10):62-0186 "On the Mechanical Properties . . . ", Oct. 1970.
Umekawa et al., Chem. AB. 72(26):135464m "Mechanical Properties of Stainless . . . ", 1970.
Umekawa et al., Chem. Ab 76(6):27408v "Strength of Stainless Steel Fiber . . . ", 1971.
Nakazawa et al., Chem ab. 76(24):143948v "Fracture Behavior of Stainless Steel . . . ", 1972.

*Primary Examiner*—L. Dewayne Rutledge
*Assistant Examiner*—David W. Schumaker
*Attorney, Agent, or Firm*—Ralph Hammar

[57] ABSTRACT

Tin-based alloys filled with steel shots or/and reinforced with short tin-coated steel fibers were prepared by melting the alloy phase and by mixing filler shots/fibers with the molten alloy in an air atmosphere with the addition of ammonium chloride. The content of steel shots ranges up to about 40 weight % and the fraction of tin-coated steel fibers ranges up to about 30 weight %. New reinforced composite alloys have a higher strength than unreinforced conventional alloys while keeping the melting temperature of new composites in the same range of unreinforced alloys.

18 Claims, 3 Drawing Sheets

FUSIBLE CORE ALLOY COMPOSITES FOR PLASTICS MOLDING

STATEMENT OF COPENDENCY

This application is a continuation-in-part of application Ser. No. 07/187,734, filed Apr. 27, 1988 pending, which is a continuation-in-part of application Ser. No. 07/166,060 filed Mar. 9, 1988 pending. Both previous applications were invented by Y. O. Lhymn and C. Lhymn.

INTRODUCTION

This to the preparation of core materials for use with the lost core technology for molding plastic parts with a hollow internal space such as air intake manifold, water pump housing, turbocharger housing, fan blade, etc. in automobile industry. New core materials were economically produced by applying the composites technology to traditional tin-based fusible alloys.

BACKGROUND OF THE INVENTION

The progress of lost core technology for fabricating complex plastic parts with a hollow curved internal space has faced the problem of dimensional stability and consequent reproducibility in mass production. Such dimensional nonuniformity is the result of weak strength at a higher molding temperature for manufacturing thermoset or thermoplastic parts. As a core material, tin-based alloys were employed as stated in prior art [1. *Automotive Engineer* v.12 n.1 Feb/Mar (1987) p 38; 2. British Pat. GB 2165860 A (UK) (1985); 3. *Automobil Tech. Z.* v.89 n.3 Mar (1987) p 139]. The weakness problem of such monolithic alloys has been solved by applying the concept of composites technology and thus fiber reinforced metal matrix composites have been invented as described in prior art by the present inventors [4. U.S. Pat. application Ser. No. 07/166,060 filed Mar. 9, 1988; 5. U.S. Pat. application filed Apr. 27, 1988 "Development of Fusible Alloy Composites"]. It is now possible to produce cores with a higher strength than monolithic alloys while maintaining the melting point of new core materials in the same range of conventional monolithic alloys. The cost of producing such fibrous metal matrix composites was about the same as conventional alloys. It will be economically desirable to produce acceptable core materials at a cheaper cost than traditional alloys. It is the goal of this invention to produce such core materials.

SUMMARY OF THE INVENTION

The process of the invention comprises the following steps or operations:
1. Precleaning steel shots or tin-coated steel fibers.
2. Preparation of tin-bismuth or tin-lead-antimony alloy.
3. Mixing steel shots or tin-coated short steel fibers with the molten tin-based alloy in air by adding a cleaning agent such as ammonium chloride.

An attractive feature of composites technology derived from the present invention is the low cost of production compared to the presently available tin-based alloy without degrading mechanical and physical properties such as strength and melting point. Reinforcing steel shots or steel fibers can have any carbon content and can contain additional alloying elements. Reinforcement can be done also by copper-coated steel fibers or by copper shots.

BRIEF DESCRIPTION OF DRAWINGS

The drawings represent microstructural morphology of tin-based matrix composites in which.

DETAILED DESCRIPTION OF THE INVENTION

Figure 1:
FIG. 1 represents a SEM (Scanning Electron Microscopy) micrograph of tin-bismuth alloy filled with steel shots.
Figure 2:
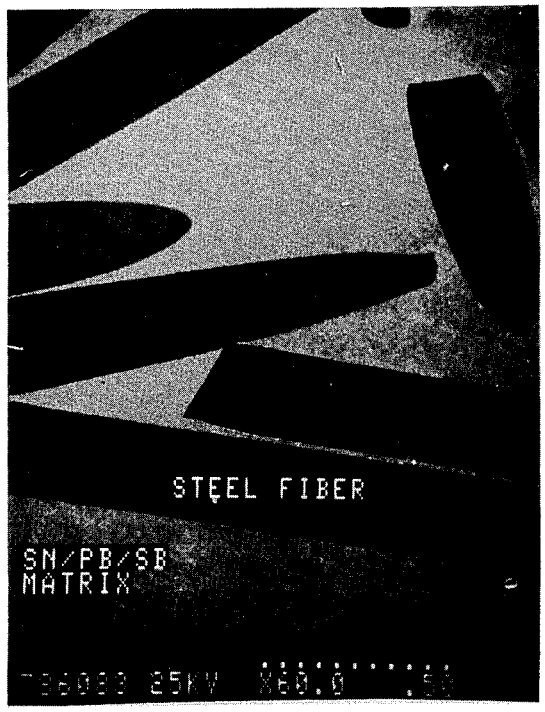
FIG. 2 represents a SEM micrograph of tin-lead-antimony alloy reinforced with tin-coated steel fibers.
Figure 3:
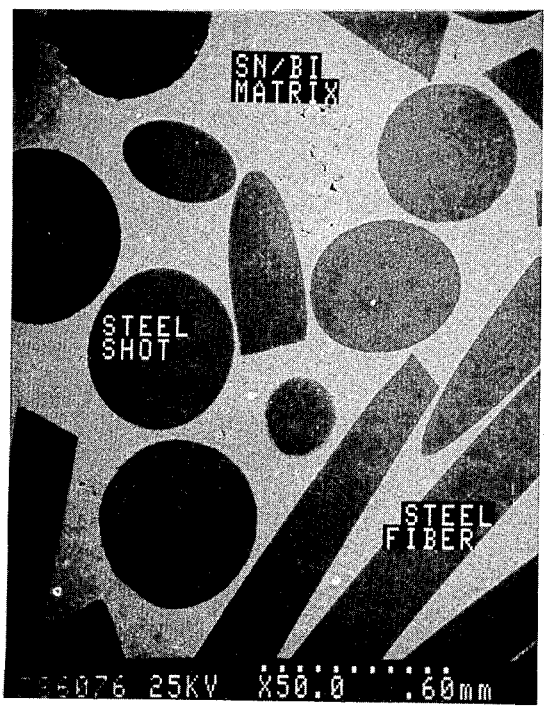
FIG. 3 represents a SEM micrograph of tin-bismuth alloy reinforced with tin-coated steel fibers and steel shots.

We have invented low cost fusible alloy composites that are suitable as a core for use with the lost core technology. A preferred composite of our invention is a tin-bismuth or tin-lead-antimony alloy filled with steel shots or/and reinforced with tin-coated steel fibers as shown in FIGS. 1, 2, and 3. The presence of fillers or reinforcements increases the strength while the melting temperature is determined by the compositional details of the alloy matrix phase. It is essential that the processing temperature must be low enough not to melt the steel component. For various fusible alloy composites to be described in the following six examples, mechanical strength properties such as tensile strength of alloy composites are higher than unreinforced monolithic alloys while the melting temperature of composites is about the same as monolithic alloys. In general, reinforcements can be copper-coated steel fibers or any metallic materials of any geometry.

The preferred geometry is shots. THe preferred metal shots are copper shots or steel shots, although any metal shots can be used as long as the metal shots have a higher melting point than the matrix malloy. The reinforcement metal shots should compose less than 50% by weight of the composite and preferably be less than 40% by weight. The diameter of the metal shots should be less than 1 inch and preferably should be between 0.3 and 0.5mm.

EXAMPLE 1

A binary alloy of 90 weight % tin- 10 weight % bismuth was prepared by melting in air. To this molten tin-bismuth alloy was added a mixture of 40 weight % precleaned steel shots and 1 to 5 weight % ammonium chloride powder. Steel shots were precleaned in 10% hydrochloric acid, rinsed in water, rinsed in acetone prior to mixing. The diameter of steel shots is about 0.3 to 0.5 mm and the melt was given an agitation in an air atmosphere. The melting point of fabricated composites is about 200 degree C. The alloy may be 80–94% tin and 5 to 20% bismuth.

EXAMPLE 2

A ternary alloy of 59 weight % tin- 34 weight % lead- 7 weight % antimony was prepared by melting and to this molten alloy was added a mixture of 35 weight % precleaned steel shots and 1 to 5 weight % ammonium chloride powder. The precleaning of steel shots consists of immersion in a 10% hydrochloric acid, rinsing in water, and rinsing in acetone. The diameter of steel shots is about 0.3 to 0.5 mm and the whole operation was performed in air. The melting temperature of fabricated composites is 185 to 189 degree C. The tin may be 50 to 65%, the lead 30 to 40% and the antimony 2 to 9%.

EXAMPLE 3

The eutectic alloy of 57 weight % bismuth-43 weight % tin was prepared by melting in air and to this melt was added 40 weight % precleaned steel shots and 1 to 5 weight % ammonium chloride powder. Precleaning steps for steel shots are same as described in example 1 or example 2 and the diameter of steel shots is 0.3 to 0.5 mm. The melting point of fabricated composites is 137 to 139 degree C.

EXAMPLE 4

To the molten melt of three kinds of matrix alloy in the preceding examples 1, 2, and 3, tin-coated steel fibers of 25 weight % was added together with 1 to 5 weight % ammonium chloride. The length of short tin-coated steel fibers is about 2 to 3 mm and the diameter is about 0.16 mm.

EXAMPLE 5

Hybrid composite alloys can be fabricated as follows. To the molten alloy of tin-bismuth, tin-lead-antimony, or eutectic tin-bismuth as described in examples 1, 2, and 3, was added a mixture of 20 weight % precleaned steel shots, 10 weight % tin-coated steel fibers, and 1 to 5 weight % ammonium chloride powder in air under agitation.

EXAMPLE 6

To the molten alloy of tin-bismuth, tin-lead-antimony, or eutectic tin-bismuth as described in examples 1, 2, and 3, was added 25 weight % copper-coated short steel fibers and 1 to 5 weight % ammonium chloride powder in air.

Having disclosed our invention and provided teachings which enable others to make and utilize the same, the scope of our claims may now be understood as follows.

What is claimed is:

1. A tin-based or tin-bismuth eutectic alloy matrix composite usable as a fusible core material in the lost core technology consisting essentially of:
   (a) a tin-bismuth alloy matrix or a tin-lead antimony alloy matrix; and
   (b) a reinforcing agent comprising metal shots.

2. The composite of claim 1 wherein said alloy composites were made using an ammoniumchloride cleaning agent during mixing.

3. The composite of claim 1 wherein the diameter of said metal shots is less than 1 inch.

4. The composite of claim 1 wherein said metal shot are steel or copper shot.

5. The composite of claim 1 wherein the diameter of said metal shot is 0.3 to 0.5 m.

6. The composite of claim 1 wherein the content of said metal shots is less than 50 weight %.

7. The composite of claim 1 wherein the content of said metal shot is less than about 40 weight %.

8. The composite of claim 1 wherein the composition of said tin-bismuth alloy is about 80 to 94 weight % tin and about 5 to 20 weight % bismuth.

9. The composite of claim 1 wherein the composition of said tin-bismuth eutectic alloy is about 43 weight % tin—about 57 weight % bismuth.

10. The composite of claim 1 wherein the composition of said tin-lead-antimony alloy is about 50 to 65 weight % tin, about 30 to about 40 weight % lead, and about 2 to about 9 weight % antimony.

11. The composite of claim 1 wherein said metal shots are steel shots.

12. The composite of claim 1 wherein said metal shots are copper shots.

13. A reinforced fusible tin-based or tin-bismuth eutectic alloy composite prepared by adding a cleaning agent wherein the reinforcing agent is any metal shots.

14. The composite of claim 13 wherein the melting temperature of said reinforcing agent is higher than tin-based or tin-bismuth eutectic alloys.

15. The composite of claim 13 wherein the weight fraction of said reinforcing agent is less than about 50 weight %.

16. The composite of claim 13 wherein the weight fraction of said metal shots is less than about 40 weight %.

17. The composite of claim 13 wherein the diameter of said metal shot is less than about 1 inch.

18. The composite of claim 13 wherein mechanical strength properties and tensile or compressive strength of said fusible alloy composites are higher than those of the unreinforced alloy containing no metal shots.

* * * * *

UNITED STATES PATENT AND TRADEMARK OFFICE
CERTIFICATE OF CORRECTION

PATENT NO. : 4,927,712

DATED : May 22, 1990

INVENTOR(S) : Yoon O. Lhymn and Chang Lhymn

Assignee: Yoon Technology

It is certified that error appears in the above-identified patent and that said Letters Patent is hereby corrected as shown below:

In Claim 5, line 2, 0.5 m should be 0.5 mm.

Signed and Sealed this

Eleventh Day of June, 1991

Attest:

HARRY F. MANBECK, JR.

Attesting Officer

Commissioner of Patents and Trademarks